April 19, 1927.

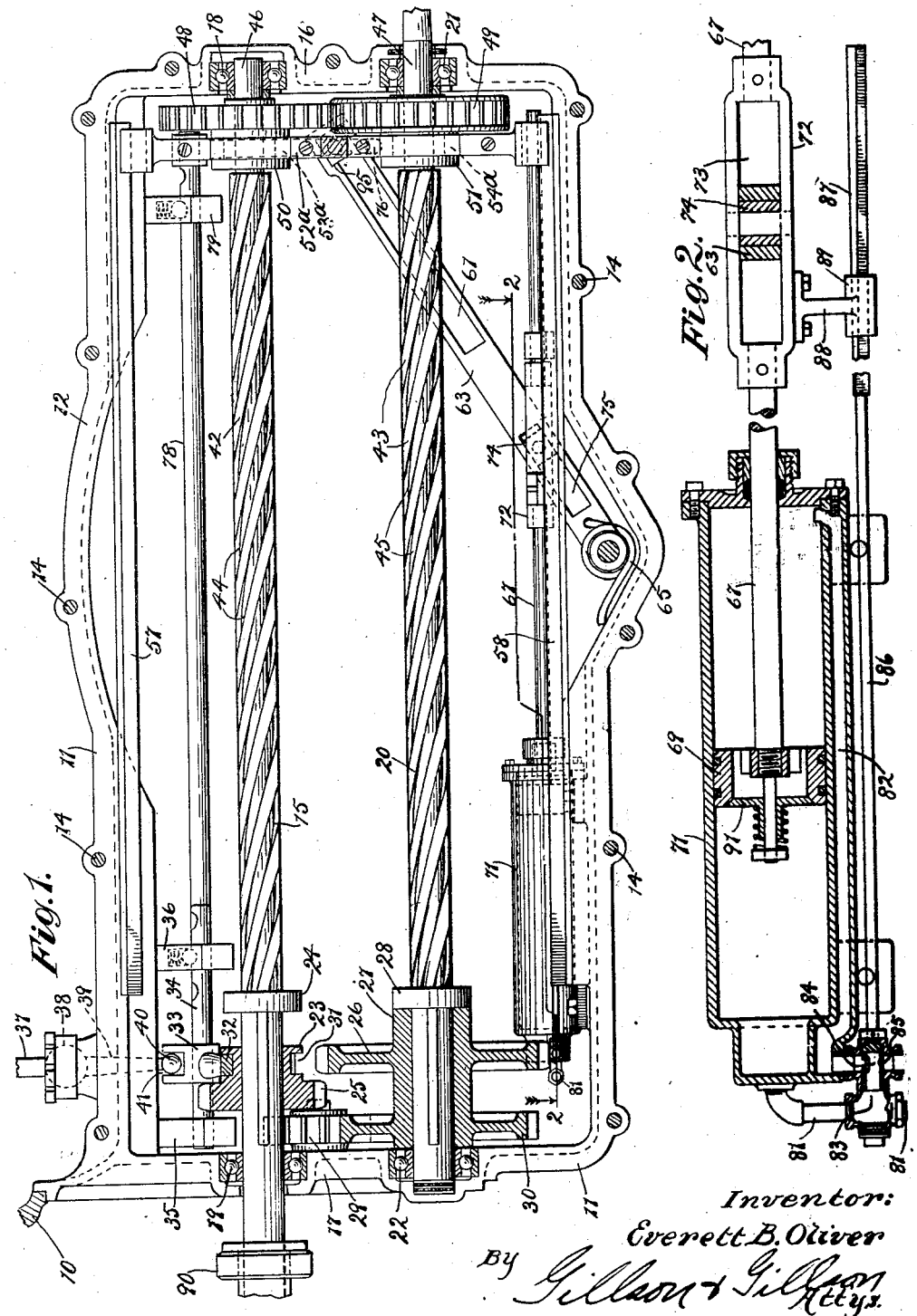

E. B. OLIVER 1,624,968

TRANSMISSION MECHANISM

Filed June 10, 1922    2 Sheets-Sheet 2

Inventor:
Everett B. Oliver
By Gillson & Gillson
Attys.

Patented Apr. 19, 1927.

1,624,968

UNITED STATES PATENT OFFICE.

EVERETT B. OLIVER, OF CHICAGO, ILLINOIS.

TRANSMISSION MECHANISM.

Application filed June 10, 1922. Serial No. 567,360.

The invention relates to a transmission mechanism for internal combustion engines, and of a type particularly applicable to automobiles. The object of the invention is to permit the ratio between the crank shaft and the driving wheels to be varied without changing gears; to permit the ratio to be automatically decreased from low to high during the starting and acceleration of the vehicle; to permit the usual or any suitable selective gear transmission to be used at will independently of the improved ratio-changing means; and to generally improve transmission mechanisms for automobiles.

An illustrative embodiment of the invention is shown in the accompanying drawings, in which—

Fig. 1 is a longitudinal section through the transmission casing, showing the gearing partly in section and partly in elevation;

Fig. 2 is a fragmentary plan section on the line 2—2 of Fig. 1, showing one of the oil cylinders used in connection with the preferred form of the invention;

Figure 3:
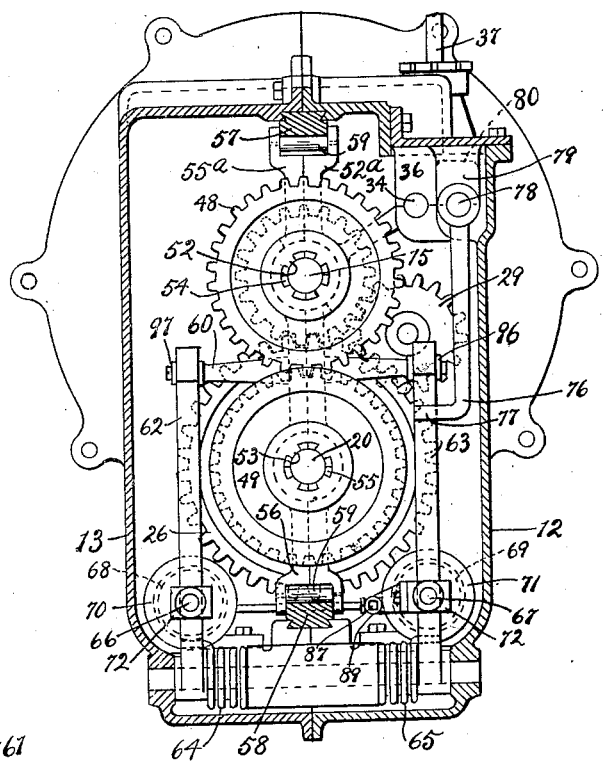
Fig. 3 is a transverse vertical section through the casing, the transmission mechanism being shown in end elevation.
Figure 4:
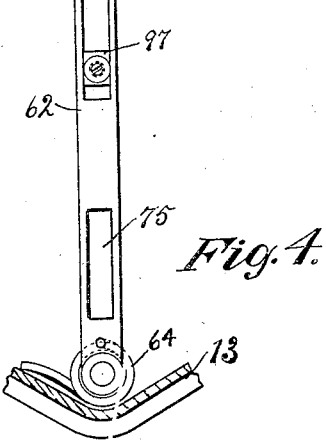
Fig. 4 is a detail view showing one of the swinging levers for connecting the piston rods of the fluid cylinders with a portion of the transmission gearing.

A portion of the casing of an internal combustion engine is represented at 10, and suitably secured to the rear end thereof is the transmission casing 11, which may be of ordinary construction and is shown as formed in two vertical halves 12, 13, secured together at their upper and lower edges by means of bolts or rivets 14.

A driving shaft 15, driven from any suitable source of power, is shown as journaled within the end walls 16, 17, of the transmission casing, suitable bearings 18, 19, being provided for this purpose. A power transmitting shaft is shown at 20, and is preferably located directly below the shaft 15, bearings 21, 22, being provided for this shaft.

While the transmission mechanism for low or intermediate and for reverse speeds may be of any well known type, the preferred form will now be described. As shown a longitudinally slidable sleeve 23 is keyed upon the driving shaft 15, its sliding movement being limited in one direction by the front wall 17 of the transmission casing, and in the other by a fixed collar 24 which may be formed integral with the shaft 15. When it is desired to impart a comparatively slow speed to the power transmitting shaft 20, and thus to the rear wheels of an automobile, or to other mechanism not shown, the gear 25, which is formed on the sleeve 24, is brought into mesh with a similar gear 26 formed upon a sleeve 27 keyed to the shaft 20, and restrained from longitudinal movement in one direction by means of a fixed collar 28, and in the other by the front wall 17. The relative sizes of the gears 25 and 26 will, of course, determine the speed at which the shaft 20 will be rotated, but it is thought preferable to have the gear 26 only slightly larger than the gear 25, so that when the two are in mesh a so-called intermediate rather than a very low speed is imparted to the transmission shaft.

For going into reverse the gear 25 is brought into mesh with an idler pinion 29, journaled in the front wall of the casing and meshing with a second gear 30 formed upon the sleeve 27. As shown in Fig. 1, the transmission mechanism is in neutral position, the gear 25 meshing with neither the intermediate nor reverse gears. While only two gears are shown as formed on the sleeve 27, it is evident that more may be employed if desired. It is, however, one of the objects of the invention to avoid unnecessary shifting of gears, and to this end only the minimum number of fixed gears is shown.

Any suitable means for shifting the sliding gear 25 may be employed. As shown, the collar 23 has formed therein an annular groove 31, into which fits a tongue 32, carried by a collar 33, fixedly mounted upon a short longitudinally slidable rod 34, shown as supported in brackets 35 and 36. The collar 33, and with it the sleeve 23 and gear 25, may be shifted longitudinally by means of a hand lever, fragmentarily shown at 37, which is mounted in the casing 11 for universal movement by means of a ball joint 38, the lower end 39 of the lever also having formed thereon a ball 40 which is adapted to engage a slot 41 in the collar 33. This gear-shifting mechanism is old in the art and no claim is made to this feature, except in combination with the whole transmission mechanism.

As shown, the shafts 15 and 20 are provided, for the greater portion of their lengths, with spiral threads 42 and 43 and intermediate grooves 44 and 45, respectively, preferably four parallel threads being formed in each shaft, though this number may be departed from if desired. Adjacent their rear ends the shafts 15, 20, are reduced, as at 46, 47, there being no threads formed in the reduced portions.

A pair of intermeshing treveling gears 48, 49, are formed on sleeves 50, 51, mounted upon the shafts 15 and 20, respectively. The sleeves have formed on the internal surfaces thereof threads 52, 53, and grooves 54, 55, corresponding to the threads and grooves on the shafts 15 and 20. Except when in high gear or when going from neutral to high, or vice versa, the sleeves 50 and 51 rest loosely upon the reduced end portions of the shafts 15 and 20.

When it is desired to go from neutral into high the sleeves 50, 51, must be moved to the left until their grooves engage the threaded portions of the shafts 15 and 20. This may be accomplished in any suitable manner. As shown, the sleeves 50, 51, are connected by means of a yoke 52$^a$, which clasps the sleeves between its arms, annular grooves 53$^a$, 54$^a$, being formed on the sleeves to receive these arms. At its upper and lower ends, 55$^a$ and 56, the yoke is bifurcated to engage guide members 57, 58, formed in the upper and lower walls, respectively, of the transmission casing. Preferably rollers 59, 59, are mounted in the bifurcated ends of the yoke to facilitate longitudinal movement thereof.

The yoke 52$^a$ serves to hold the gears 48, 49, in vertical alignment and constantly in mesh. When the yoke is shifted to the left in a manner to be presently described, and the internally grooved sleeves carrying the gears 48, 49, are brought into engagement with the threaded portion of the shafts 15 and 20, it is evident that unless force is applied to restrain, to a certain extent, the longitudinal movement of the gears 48, 49, the two gears will merely work their way to the left until the end of the threaded portions of the shafts is reached, without transmitting any rotating movement from the upper to the lower shaft. This is particularly true where a load is applied at the end of the power transmitting shaft 20.

If, however, a force be applied to restrain the longitudinal movement of the gears, it will be readily seen that the rotating sleeve 51 will grip the shaft 20 and cause it to rotate also. If the longitudinal movement were completely restrained the speed of rotation of the sleeve and the shaft 20 would be the same. If it be only partly restrained there is a slippage between the parts. For a perfect transmission mechanism it is desirable to have the restraining force applied gradually, until finally there is no further longitudinal movement and the shafts 15 and 20 are positively interconnected by means of the gears 48 and 49.

According to a preferred embodiment of the invention this gradual increase in the restraining force is applied by connecting, by means of suitable links, the yoke 52$^a$, which clasps the gear-carrying sleeves to the rods of pistons which work in fluid-carrying cylinders. Preferably each cylinder has a by-pass connecting its ends, which is gradually and automatically cut off as the yoke is moved toward the left. Other restraining devices may be employed without departing from the spirit of the invention.

As shown in Fig. 3, a cross-rod 60 is connected to the yoke 52, preferably intermediate the gears 48 and 49. The ends of this rod carry cross-heads 96, 97, which slide in slots 61, 61, formed at the upper portions of a pair of swinging levers 62, 63, journaled at their lower ends upon a transverse rod mounted in the bottom of the casing 11. Preferably a pair of coil springs, as 64, 65, each having one end bearing against a fixed portion of the frame and the other end engaging its corresponding levers 62, 63, hold the levers normally in the position shown in Fig. 1, thereby holding the sleeves 50, 51, out of engagement with the threaded portions of the shafts 15 and 20.

In the construction shown the slot 61 in the lever 63 is shown as enlarged at its upper end, the cross-head in its normal position resting in this enlarged portion and bearing against a shoulder 95, thereby locking the yoke 52$^a$ in the neutral position.

As shown, the swinging movement imparted to the levers 62, 63, as the gears 48, 49, travel longitudinally along their respective shafts is translated into the rectilinear movement of a pair of piston rods 66, 67, carrying piston heads 68, 69, which work in fluid containing cylinders 70, 71, preferably filled with a light cylinder oil.

A convenient means of connection between the corresponding levers and piston rods is shown in Figs. 1 and 2. Intermediate the ends of the piston rod there is inserted a coupling member 72, connected to the ends of the rod and slotted for a portion of its length. At the center of the slot 73, and journaled in the sides of the coupling member, is a cross-head 74, which is adapted to engage a slot 75, formed in the corresponding swinging lever 62 or 63.

To initiate the change from neutral to high speed it is only necessary to lift the lever 63, thereby releasing the cross-head 96 from engagement with the shoulder 95. The internal sleeves 50, 51, carrying the gears 48, 49, are thus brought into engagement with the threaded portions of the corresponding shafts 15, 20.

As shown, a lever 76, having a lateral finger 77, projecting in rear of one of the swinging levers, as 63, is secured to a longitudinally slidable rod 78, mounted in suitable brackets, as 79 and 36. This rod is adapted to be operated by means of a hand lever 37, which is merely swung sidewise, so that the ball 40, on its lower end, engages a collar 80 formed near the end of the rod 78.

The preferred means for gradually increasing the resistance to the longitudinal movement of the gears 48, 49, is shown in detail in Fig. 2. The oil cylinders 70, 71, are connected at their ends by a pipe 81, for equalizing the pressures within the cylinders. In addition to the equalizing pipe each cylinder is provided with a by-pass 82, which connects the front and rear ends of the cylinder. As shown, the by-pass 82 in the cylinder 71 leads from a chamber 83, communicating with the equalizing pipe to an outlet 84 in rear of the piston head 69. Within the chamber 83 is a rotatable valve 84, which controls the front outlet 85 of the by-pass 82. Preferably the same valve controls the outlet of a similar by-pass (not shown) in the other cylinder, though it is possible to use two valves, if desired. The stem 86 of the rotating valve extends rearwardly and at its end 87 there is formed a spiral.

Secured to the coupling member 72 of the piston rod 67 is a bracket 88, having a head 89 which is internally grooved to correspond with the spiral end 87 of the valve stem, the head sliding thereon as the piston rod is reciprocated, thereby rotating the valve 84 to open or close the port 85. The valve is so adjusted that the port 85 is open at the beginning of the stroke of the piston, and completely closed at the end of the stroke, thereby gradually increasing the resisting force which must be overcome by the advancing gears 48 and 49. When the valve is completely closed the travelling collars 50, 51, carrying the gears should be in engagement with the fixed collars 24 and 28, respectively, and the shaft 20 is then rotating at its maximum speed.

To go from high into neutral it is only necessary to throw out the clutch, conventionally illustrated at 90. There then being no torque applied to the shaft 15, and as the shaft 20 is still rotating at high speed, the force acting on the gear-carrying collars 50, 51, will be reversed in direction and the gears will be carried back to the neutral position shown in Fig. 1. In order that the resistance to this return movement may be as small as possible, the piston heads 68, 69, are each provided with spring-pressed valves, as 91, which open at the commencement of the return movement and offer but little obstruction to the free passage of oil through the piston head.

In case the shaft 20, for any reason, is not rotating the coil springs 64 and 65 bearing on levers 62 and 63, respectively, serve to return the gears 50 and 51 to neutral position.

The usual transmission can be used in the ordinary manner when it is desired, and thus any of the selective ratios may be established and maintained for the desired period. When for any reason the operator prefers not to select and shift gears he can engage the automatic mechanism, which will start, gradually accelerate, and drive the vehicle upon engagement of the clutch, and, upon the release of the clutch, will readjust itself preparatory to repeating the operation.

I claim as my invention—

1. A power transmission mechanism comprising, in combination, threaded driving and driven shafts, a pair of intermeshing gears each mounted on the threaded portion of one of said shafts, means for rotating the driving shaft whereby longitudinal movement of the gears is effected, and means for retarding the longitudinal movement whereby rotation of the driven shaft is effected, said means comprising a fluid-containing cylinder, a piston therein, and a pivoted link connected to said piston and bearing against said gears.

2. In a power transmission mechanism, a pair of intermeshing gears each mounted upon a shaft, means for moving one of said gears longitudinally along its shaft, a yoke connecting said gears for holding the same constantly in mesh, a lever connected to said yoke at one end, a fluid cylinder, and a piston working in said cylinder and having a piston rod also connected to said lever.

3. In a power transmission mechanism, the combination of a driving and a driven shaft, each being screw-threaded for a portion of its length, internally threaded gears mounted one on each shaft, means for causing said gears to move together along said shafts, means for gradually retarding said longitudinal movement comprising a fluid-containing cylinder, a piston in said cylinder, means connected to said piston and bearing against said gears, a by-pass between the ends of said cylinder having a valve therein, and means operated by one of the longitudinally movable parts for varying the opening of said valve.

4. In an automobile, the combination of a sectional power shaft, a clutch member therefor, a driven shaft, change speed mechanism between said shafts normally in position to drive said driven shaft at low speed upon the initial movement of said power shaft, said mechanism comprising members having spiral surfaces rotated by said power shaft, means slidable along said surfaces and rotated thereby upon the initial rotation of said power shaft for automatically changing the relative speeds of said power and driven shafts, said means being automatically returned to low speed position upon the continued forward movement of said automobile when said clutch member is released, means for yieldingly resisting the sliding movement of said first named means along said spiral surfaces in the direction to change from low to high speed, and means for varying said resistance whereby the time required for the complete sliding movement of said first named means for changing from low to high speeds may be changed.

5. In a transmission for automobiles, the combination of a driving shaft, a gear having driving engagement with said driving shaft but permitted axial movement thereon, a threaded driven shaft, a driven gear threaded on said shaft and meshed with said first-mentioned gear, a non-threaded portion on said driven shaft, means to hold said gears meshed and constrain them to move axially together, and yielding means for resisting axial movement of said gears and for returning said driven gear to the non-threaded portion of said driven shaft.

6. In a transmission for automobiles, the combination of a driving shaft, a driving gear in driving engagement therewith, a driven shaft, a driven gear in driving engagemet with the driven shaft and the driving gear, the engagement between one of said shafts and its gear being capable of producing axial movement of the gears, means for causing the gears except when said gears are in inoperative position to move together axially, and yielding means for resisting such movement and for returning said gears to inoperative position.

7. In a transmission for automobiles, the combination of a driving shaft, a driving gear in driving engagement therewith, a driven shaft, a driven gear in driving engagement with the driven shaft and the driving gear, the engagement between one of said shafts and its gear being capable of producing axial movement of the gears, means for causing the gears to move together axially, yielding means for offering increasing resistance to the axial movement of the gears in one direction, and means to move the gears in the opposite direction.

8. In a transmission for automobiles, the combination of a clutch, a driving shaft controlled by the clutch, a driving gear in driving engagement with the driving shaft, a driven shaft, a driven gear in driving engagement with the driven shaft and the driving gear, the driving engagement bewteen one of said shafts and its gear being constructed to produce axial movement of said gears in one direction, means to yieldingly resist such axial movement, and means to return said gears when the driving pressure is released.

9. In a transmission for automobiles, the combination of a driving shaft, a driven shaft, a selective gear transmission between said shafts, a driving gear in driving engagement with said driving shaft, a driven gear in driving engagement with said driving gear and said driven shaft, the engagement between one of said shafts and its gear being constructed to produce axial movement of the gear along the shaft, and means to yieldingly resist such axial movement with an increasing degree as the movement increases.

10. In an automobile, the combination of a driving shaft, a clutch therefor, a driving gear threaded on said driving shaft, gearing driven by said driving gear for driving the automobile and means including a fluid retarding device for offering resistance to said driving gear as it moves along the driven shaft.

11. In an automobile, the combination of a clutch, a driving shaft controlled thereby, a driven shaft, selective gear transmission between said shafts, a driving gear threaded on said driven shaft, means to resist movement of the driving gear along the driving shaft, and means driven by the driving gear for propelling the automobile.

12. In an automobile, the combination of a driving gear, a driven gear meshing with said driving gear, yielding means for offering an increasing resistance to the rotation of said driven gear, and means for rendering said driving gear inoperative for driving said driven gear.

EVERETT B. OLIVER.